Jan. 13, 1953  L. R. BURG  2,624,972
ICE FISHING RIG
Filed May 12, 1947
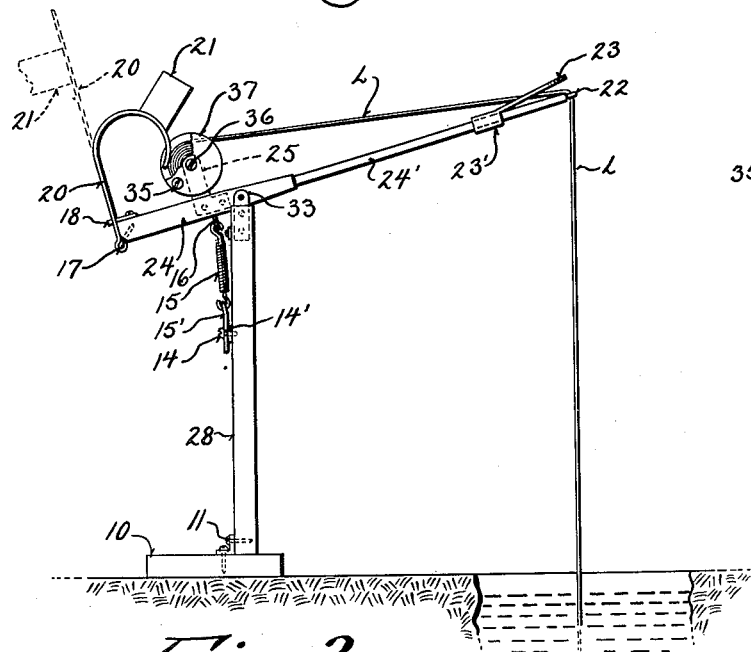
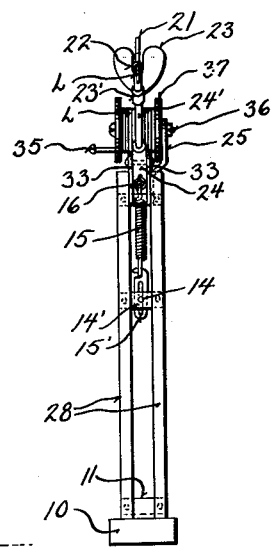
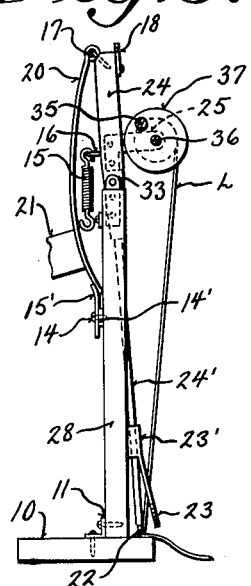
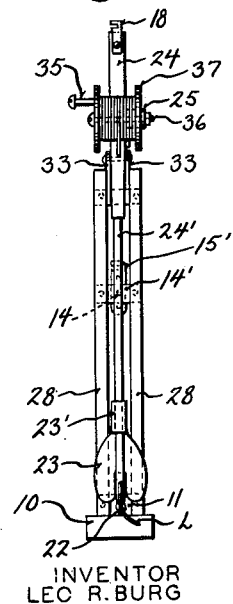
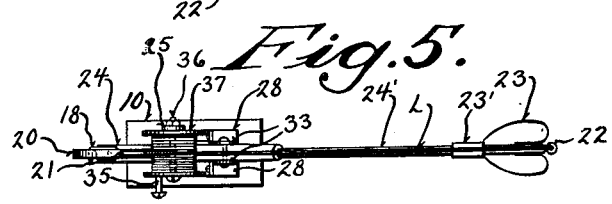
INVENTOR
LEO R. BURG
BY *Young and Wright*
ATTORNEYS

Patented Jan. 13, 1953

2,624,972

UNITED STATES PATENT OFFICE 2,624,972

ICE FISHING RIG

Leo R. Burg, West Bend, Wis.

Application May 12, 1947, Serial No. 747,381

1 Claim. (Cl. 43—17)

My invention refers to rig stands especially designed for ice fishing, but obviously it may be conveniently used on a wharf or boat. The object of my invention is to provide a stem having a spring balanced, pivoted rod equipped with a wind actuated vane and a signal flag carried by a spring strip, which serves as a warning that a fish has struck the bait. The rod is provided with a vane, whereby the same is vibrated under wind pressure, and the bait is gyrated to attract a fish. This gyrating movement of the line also serves to break up skim ice that may accumulate over the fishing hole.

A further object of my invention is to provide a collapsible stand rig, whereby the same is folded into a compact body for transportation purposes.

With the above and other objects in view, which will appear as the description proceeds, the invention resides in the novel construction, combination and arrangement of parts, substantially as hereinafter described, and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

In the drawings:

Figure 1 is a side elevation of a fish rig stand embodying the features of my invention and shown in its operative position on the ice.

Figure 2 is a front elevational view of the same.

Figure 3 is a side elevational view of my rig but illustrating the rig folded compactly for transportation.

Figure 4 is a front elevation of the folded rig; and Figure 5 is a top plan view of the rig in its extended position as shown in Figures 1 and 2 of the drawings.

Referring by characters to the drawings, 10 indicates the base, having companion bars 28 extending vertically therefrom, which bars are connected to the base by bracket 11. The upper ends of the bars have secured, thereto, ears 33, between which is pivoted the shank 24 of a rod 24' with a bracket 25 carrying a pivot 36, upon which is mounted a reel 37 carrying a line L, which is coiled about the reel. The said reel is also provided with a handle 35.

A spring strip 20 is secured to the end of the rod shank by a pivot connection 17 and said spring strip is further secured in position by a clip 18, having a notch therein adapted to engage the strip 20, it being understood that said strip carries a signal flag 21.

The rod shank is provided with an eye 16 for engagement with a coil spring 15, the opposite end of said spring being in hook connection with an elongated vertically positioned tongue 15' having an upper transverse aperture or hook formed therein, which tongue is adjustably secured in position by a bolt 14 that passes through a longitudinal slot in the tongue and engages a bridge piece 14'.

The free end of the rod 24' is provided with an eye 22, through which is threaded the fishing line L normally equipped with the hook, bait and etc., not shown.

The rod 24' has a vane 23 terminating with an adjustable thimble 23', whereby the windage may be controlled, it being understood that the vane being struck by a current of air in various directions will cause the rod to vibrate on its pivotal connection.

As indicated in Figure 1 when the rig is set, the end of the spring strip 20 engages the coil of line about the reel, causing the said strip to be bowed, as shown, whereby the flag is in effect locked in an inconspicuous position.

When a fish strikes the bait, the reel will unwind the line and in its revolutions the flag engagement between the flag strip 20 and coil of line will cause the end of said flag strip to be released from the coil, whereby the flag will, as indicated in dotted lines, be prominently displayed to signal the strike.

Particular attention is directed to the fact that the flag spring 20 is locked down in its concealed position by bowing the spring and having its end in abutting relation with the last coil of line upon the reel, hence, all complicated mechanism for locking the bowed spring down is avoided, and when a fish strikes, the outer coil of the line in its rotation will release the spring 20 to signal a strike.

Where it is desired to fold or collapse the stand and rig, as best shown in Figures 3 and 4, the coil spring 14 is released, whereby the rod may be folded down between the bars 28. To complete the fold, the flag contained spring strip 20 is disconnected from the clip 18 and folded down upon its pivot with the end of said spring fitted under the end of the vertically adjustable tongue 15', whereby the rod is locked in its folded position.

I claim:

A fishing rig of the type having an operative position and a collapsible position comprising, a pair of spaced vertically extending supporting bars, a fishing rod pivotedly secured intermediate its ends between said bars, a fishing reel mounted on the top portion of said rod intermediate the pivot point and the rear end thereof and having a fishing line on said reel, the direction of the line feed being from the top portion of said reel and over the tip of said fishing rod, a spring strip pivotally secured at its lower end to the extreme rear end of said rod adjacent the bottom portion thereof, a longitudinally extending clip rigidly secured to the top portion of said fishing rod and terminating at a point beyond the extreme rear end thereof, said clip having a transverse notch in one of its sides and of a size and configuration to receive the adjacent side edge of said spring strip, a signal flag on the upper end of said spring strip, a tongue secured between said supporting bars and extending longitudinally therewith and having a transverse aperture in its upper end, and a coil spring detachably fastened at one end in the transverse aperture of the tongue and having its opposite end secured to said fishing rod, whereby the fishing rod is resiliently held in its operative position transversely of said supporting bars, said spring strip being flexed downwardly in a direction opposed to the direction of feed of said line and having its upper flag end frictionally held to the line and reel, whereby the forward movement of said line will frictionally feed the upper end of said spring strip upwardly to release the same; said fishing rig being collapsible by releasing said coil spring from said apertured tongue, pivoting the tip end of said fishing rod forward, and releasing said spring strip from engagement with said clip, pivoting said spring strip downwardly and engaging its upper flag end under said longitudinally extending tongue.

LEO R. BURG.

REFERENCES CITED

The following references are of record in the file of this patent:

UNITED STATES PATENTS

| Number | Name | Date |
|---|---|---|
| 446,596 | Hackett | Feb. 17, 1891 |
| 1,264,000 | Bernhardt | Apr. 23, 1918 |
| 1,778,422 | Joyal | Oct. 14, 1930 |
| 1,993,342 | Gurrieri et al. | Mar. 5, 1935 |
| 2,114,529 | Goohue | Apr. 29, 1938 |
| 2,122,836 | Gegerfeldt | July 5, 1938 |
| 2,233,127 | Nissen | Apr. 15, 1941 |
| 2,296,174 | Meisler | Sept. 15, 1942 |
| 2,427,600 | Hanke | Sept. 16, 1947 |